United States Patent [19]
Lee

[11] Patent Number: 5,803,335
[45] Date of Patent: Sep. 8, 1998

[54] PINCH ROLLER ASSEMBLY HAVING A RUBBER CUSHION FOR MAKING A CONTACT SURFACE THEREOF PIVOTABLE

[75] Inventor: Chang-Ho Lee, Incheon, Rep. of Korea

[73] Assignee: Daewoo Electronics Co., Ltd., Seoul, Rep. of Korea

[21] Appl. No.: 934,687

[22] Filed: Sep. 22, 1997

Related U.S. Application Data

[63] Continuation-in-part of Ser. No. 424,743, Apr. 18, 1995, abandoned.

[51] Int. Cl.$^6$ .................................................. B65H 20/02
[52] U.S. Cl. ............................................. 226/191; 226/186
[58] Field of Search ..................................... 226/181, 186, 226/190, 191; 384/418, 202

[56] References Cited

U.S. PATENT DOCUMENTS

| | | | |
|---|---|---|---|
| 3,415,435 | 12/1968 | Bevis | 226/181 X |
| 3,658,227 | 4/1972 | Stephens | 242/615.2 |
| 3,949,919 | 4/1976 | Takei | 226/194 |
| 4,122,985 | 10/1978 | Nelson | 384/418 X |
| 4,403,720 | 9/1983 | Grant | 226/190 |
| 5,373,982 | 12/1994 | Takahashi | 226/190 X |
| 5,452,833 | 9/1995 | Hutter | 226/181 X |

FOREIGN PATENT DOCUMENTS

| | | | |
|---|---|---|---|
| 709212 | 5/1954 | United Kingdom | 226/186 |

*Primary Examiner*—Daniel P. Stodola
*Assistant Examiner*—Gregory J. Strimbu
*Attorney, Agent, or Firm*—Anderson, Kill & Olick, P.C.

[57] ABSTRACT

A pinch roller assembly used in a video cassette recorder, employs a plastic journal bearing or a metallic sliding bearing in order to pivotally carry a sleeve about a supporting shaft, the bearings retained around a lower portion of a small diameter section and on an upper end of a large diameter section of the supporting shaft and a cushion member secured around an external surface of the bearings so as to enable an external rubber contact to tilt with respect to the supporting shaft.

2 Claims, 3 Drawing Sheets

PINCH ROLLER ASSEMBLY HAVING A RUBBER CUSHION FOR MAKING A CONTACT SURFACE THEREOF PIVOTABLE

This is a continuation-in-part application of Ser. No. 08/424,743, filed Apr. 18, 1995, now abandoned.

FIELD OF THE INVENTION

The present invention is directed to a pinch roller assembly for use in a video cassette recorder; and, more particularly, to an improved pinch roller assembly which is employed to ensure a stable traveling of a magnetic tape within the recorder.

DESCRIPTION OF THE PRIOR ART

A video cassette recorder, normally referred to as "VCR" by its acronym, has a pinch roller assembly on a deck thereof, which allows a running magnetic tape to maintain a more stable running state without, for example, an increase or decrease of the running speed, a certain fluctuating movement or a severe tension variation, etc., so as to facilitate the reading/writing action of a video head from/on the running magnetic tape. In order to let the magnetic tape run with a constant speed and proper tension condition, the pinch roller assembly pivotably mounted on the deck is generally made to depress the running magnetic tape against a capstan shaft adjacent to the pinch roller assembly.

In FIG. 1, there is shown a schematic top view of a deck 10 of a conventional VCR having a pinch roller assembly 6. A magnetic tape T is intended to run toward a take-up reel 2 from a supply reel 1 through an erasing head 3, a rotating head drum 4 and a capstan shaft 5.

The pinch roller 6 is typically designed to move to and fro on the deck 10, in the direction as indicated with an arrow. During a fast forward or rewind mode operation of the VCR, the pinch roller 6 is kept detached from the capstan shaft 5. However, when a recording or reproducing mode of the VCR begins, the pinch roller 6 approaches the capstan shaft 5 to depress the running magnetic tape T against the capstan shaft 5.

In the depressing-position of the pinch roller 6, the capstan shaft 5 driven by a capstan motor(not shown) exerts the steady frictional rotation force, cooperating with the pinch roller 6, on the tape T interposed therebetween. Thus, the transfer of the tape T is done in a stable manner without incurring any unwanted increase or decrease in the running speed or a severe fluctuating movement.

Further, said rotation force of the capstan shaft 5 causes the tape T retained around the head drum 4 to be slightly tensioned so that video heads(not shown) on the head drum 4 can access the surface of the tape T more precisely.

On the other hand, for the enhancement of these functions described above by the pinch roller 6 and the capstan shaft 5, it is required that, when the pinch roller 6 meets the capstan shaft 5, the lateral surface of the pinch roller 6 applies a vertically equal depressing force on the capstan shaft 5.

It is, however, practically difficult to hold a support shaft of the pinch roller 6 and the capstan shaft 5 in a perfect parallel relationship with each other all the time when they are in use. Even if the pinch roller support shaft is installed on the deck 10 in a complete parallel relationship with the capstan shaft 5 initially, the pinch roller support shaft may be subjected to an inclination due to a deformation of its own self or a twist of a pivot arm supporting the pinch roller support shaft.

When the two shafts are not in a parallel relationship with each other, the tape T becomes partially depressed only due to the action of a limited lateral surface portion, for example, an upper portion or lower portion of the lateral surface of the pinch roller, rather than the entire vertical range of the lateral surface. This may cause the magnetic tape T to run upwardly or downwardly, deviating from its ordinary travel path, or the surface of the tape T to be damaged by a vertically unbalanced depressing force of the pinch roller.

In order to avoid these problems mentioned above, a conventional pinch roller assembly is normally provided with a ball bearing between a supporting shaft and a rotating body.

FIG. 2 shows a capstan shaft 5 and one of the prior art pinch roller assemblies 20 having a ball bearing 11. Since the ball bearing 11 is normally designed to have a very small amount of play or clearance between an inner ring 11a, balls 11b and an outer ring 11c, it is possible for a rotating body 13 of the pinch roller assembly 20 to adjust itself to predetermined amounts of angular misalignment, as indicated with $\alpha°$, with respect to a pinch roller shaft 12. This type of pinch roller assembly 20, therefore, is able to cover a non-parallel relationship between the capstan shaft 5 and the pinch roller shaft 12. However, the use of the ball bearing 11, being a relatively expensive machine element, results in an increase of the manufacturing cost of the pinch roller assembly 20.

As another method to overcome the incomplete depression problems of the pinch roller, Japanese Utility Model Laid-Open Publication No. 89-177,436 teaches a pinch roller structure which comprises a supporting shaft having a semi-circled cross sectional groove on its external surface and a cylindrical rotating body having a corresponding protuberance on the inner surface thereof.

Further, Japanese Utility Laid-Open Publication Nos. 89-177,437 and 89-174,731 disclose two pinch roller assemblies, respectively, having a ball-shaped magnetic structure and a ring-shaped bearing between a supporting shaft and a rotating body.

However, the prior art pinch roller assemblies discussed above also have other disadvantages in that the semi-circled cross sectional groove and protuberance, the ball-shaped magnetic structure and the ring-shaped bearing still give rise to difficulties in the manufacture of the pinch roller assembly.

SUMMARY OF THE INVENTION

It is, therefore, a primary object of the invention to provide a pinch roller assembly wherein the rotating portions thereof are capable of tilting with respect to a supporting shaft.

Another object of the present invention is to provide a pinch roller assembly which can be manufactured at a reasonable cost with relative ease.

The above and other objects of the invention are accomplished by providing a pinch roller assembly used in a video cassette recorder, provided with an external contact for providing a depressing surface and a sleeve closely fitted into the external contact, which comprises: i) a supporting shaft extending through an inner space of the sleeve and having a small diameter section and a large diameter section, ii) a rotating means for rotatably carrying the sleeve about the supporting shaft, the rotating means retained around a lower portion of the small diameter section and on an upper end of the large diameter section of the supporting shaft, iii) a cushion member secured around an external surface of the rotation means so as to enable the external contact to align with the supporting shaft, and iv) a pair of cylindrical bushing members closely fitted into the sleeve so as to secure the cushion member on an inner surface of the sleeve.

As a first preferred embodiment of the invention, the pinch roller assembly has a plastic journal bearing as the rotation means.

Further, a metallic sliding bearing is employed as the rotation means in a second preferred embodiment of the pinch roller in accordance with the present invention.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
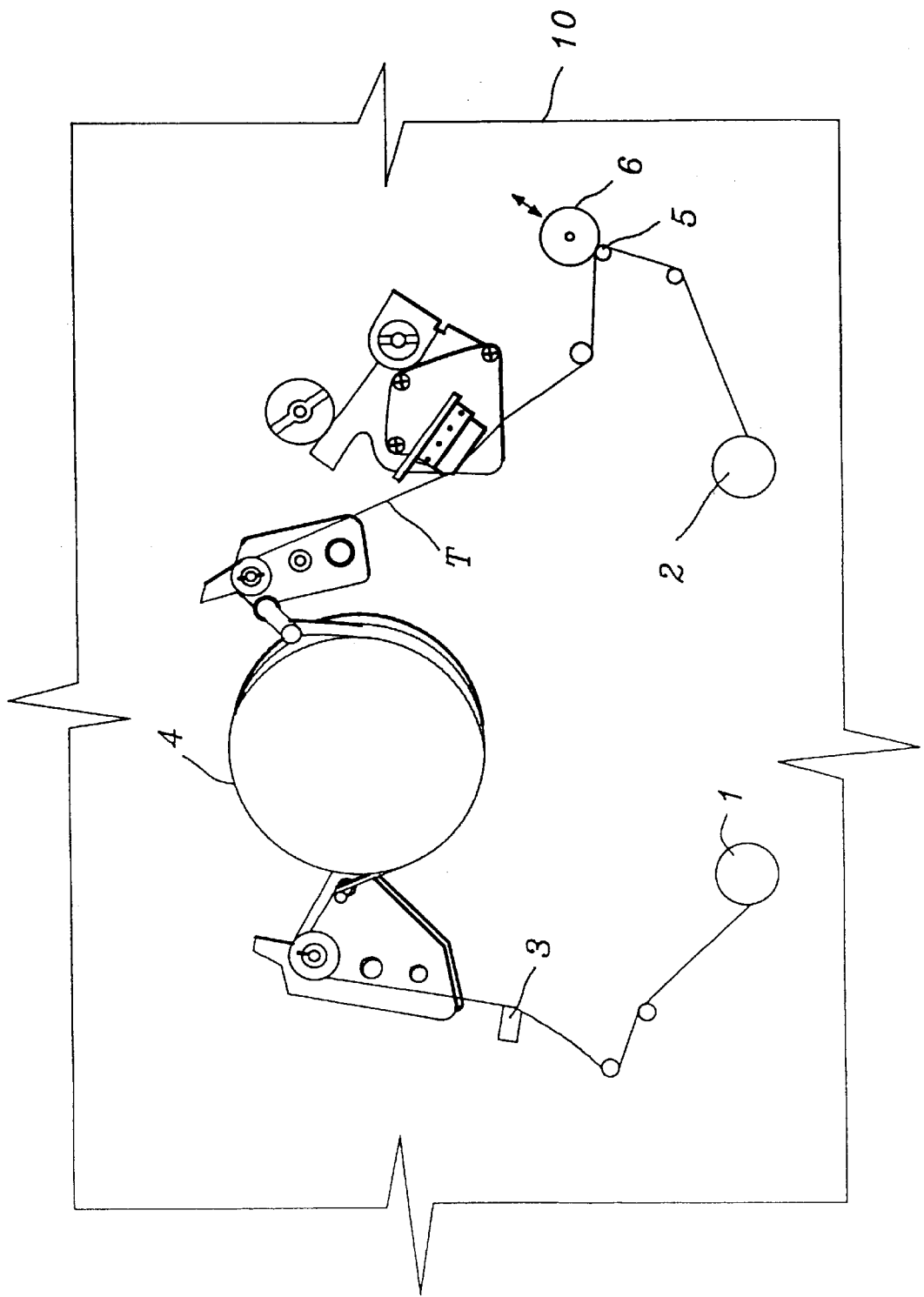
FIG. 1 shows a schematic top view of a deck of a conventional video cassette recorder.
Figure 2:
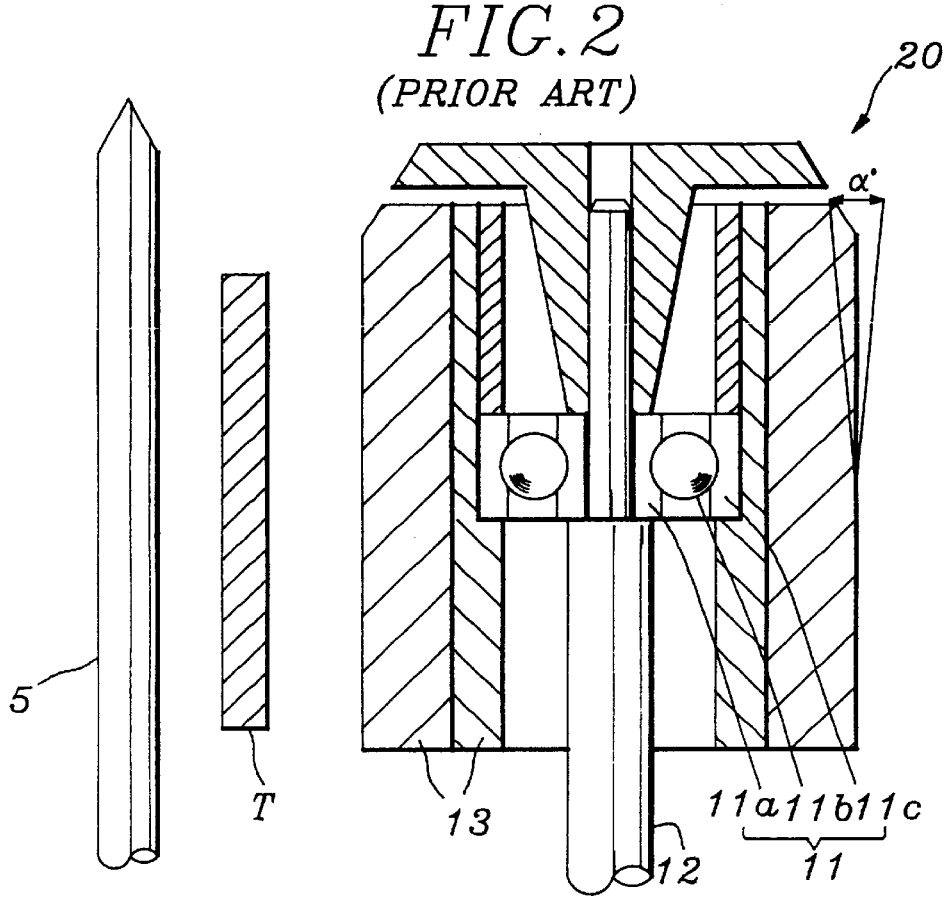
FIG. 2 represents a longitudinal sectional view of a prior art pinch roller assembly, spaced apart from a capstan shaft.
Figure 3:
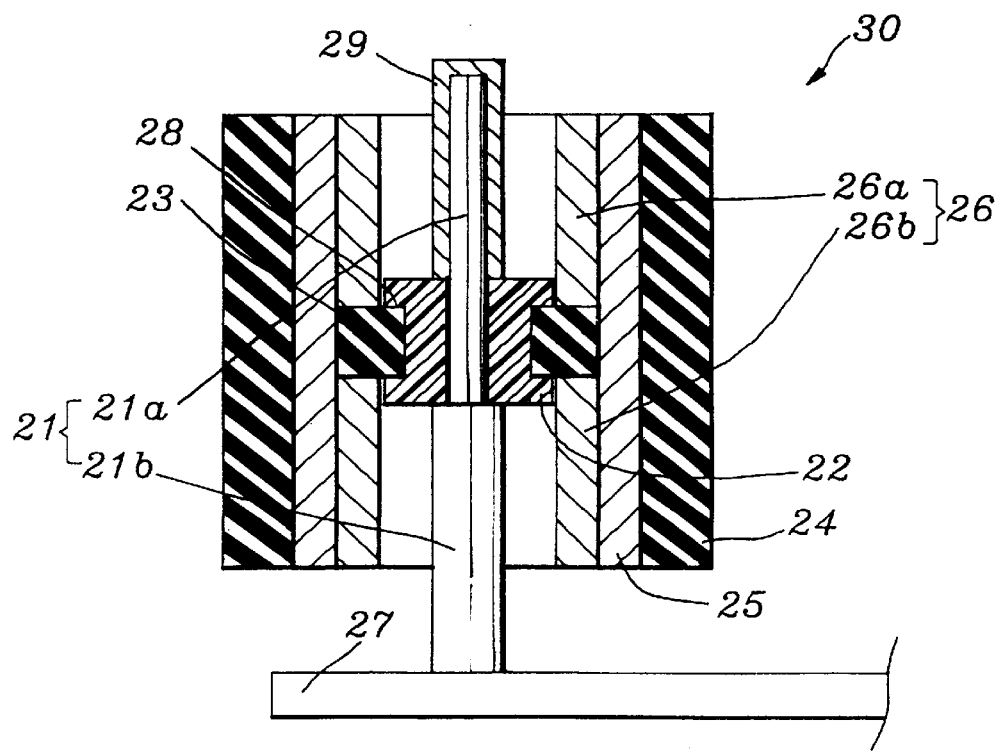
FIG. 3 illustrates a first embodiment of a pinch roller assembly in accordance with the present invention.

In FIG. 3, there is shown a longitudinal sectional view of the first preferred embodiment of the inventive pinch roller assembly 30. The pinch roller assembly 30 consists of a supporting shaft 21, a journal bearing 22, a cushion member 23, and an external contact 24, a sleeve 25 and a pair of bushing member 26a and 26b. The external contact 24, the sleeve 25 and the pair of bushing members 26a and 26b are adapted to pivot about the supporting shaft 21.

The external contact 24, which is to depress the magnetic tape (not shown) against the capstan shaft (not shown), is made of a resilient material such as rubber. The sleeve 25 is closely fitted into the external contact 24. The pair of bushing members 26a and 26b are closely fitted into the sleeve 25 for securing the cushion member 23 in such a manner that one 26b is upwardly inserted through the space under the sleeve 25 and the other 26a is downwardly inserted through the space above the sleeve 25.

The supporting shaft 21, which consists of a small diameter section 21a and a large diameter section 21b, is secured to a carrier arm 27 at its large diameter section 21b. A lower portion of the small diameter section 21a and an upper end of the large diameter section 21b function as a journal for the journal bearing 22.

The journal bearing 22 on the supporting shaft 21, which pivotally carries the cushion member 23, the external contact 24, the sleeve 25 and the pair of bushing members 26a and 26b is made of a synthetic resin.

On the other hand, in order to permit, the external contact 24, the sleeve 25 and the pair of bushing members 26a and 26b to tilt with respect to the supporting shaft 21, the inventive pinch roller assembly 30 employs the cushion member 23. The cushion member 23, which is retained into an external groove 28 of the journal bearing 22, is made of rubber. The cushion member 23 is preferably formed of rubber which has more resilience than those of the external contact 24. Therefore, the resilience of the cushion member 23 enables the external contact 24 to always align with the capstan shaft (not shown), when the external contact 24 depresses the tape against the capstan shaft, even if the supporting shaft 21 is misaligned with the capstan shaft.

On the other hand, in order to keep the journal bearing 22 in place on the supporting shaft 21, a fixing cap 29 is mounted around the small diameter section 21a, in a closely-fitted relationship with the same.

Figure 4:
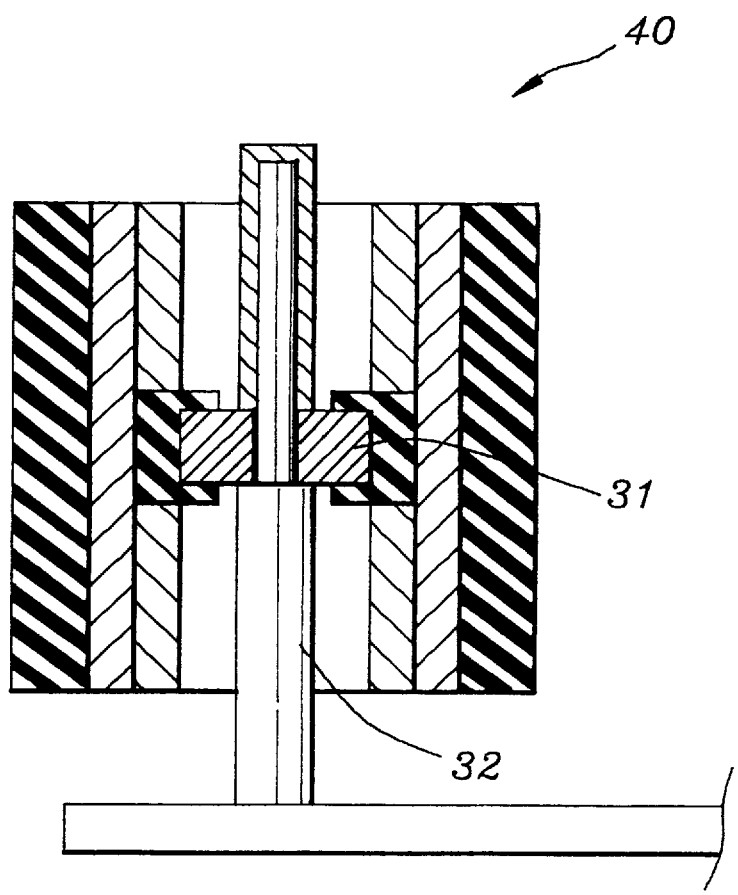
FIG. 4 offers a second embodiment of the pinch roller assembly in accordance with the present invention.

FIG. 4 shows a second embodiment of the inventive pinch roller assembly 40 which utilizes a metallic sliding bearing 31. The metallic sliding bearing 31 is adapted to use a lubricating oil so that an oil film generated between the bearing 31 and the supporting shaft 32 can reduce the frictional resistance therebetween.

Although the invention has been shown and described with respect to the preferred embodiments, it will be understood by those skilled in the art that various changes and modifications may be made without departing from the spirit and scope of the invention as defined in the following claims.

What is claimed is:

1. A pinch roller assembly, for use in a video cassette recorder, comprising:

a cylindrical external contact having a contact surface for contacting a magnetic tape;

a sleeve closely fitted into the cylindrical external contact;

a supporting shaft extending through the sleeve, the supporting shaft having a small diameter section and a large diameter section;

a plastic sliding bearing for carrying the cylindrical external contact and the sleeve about the supporting shaft, the plastic sliding bearing being rotatably retained around a lower portion of the small diameter section of the supporting shaft by an upper end of the large diameter section of the supporting shaft;

a fixing cap mounted around the small diameter section to keep the plastic sliding bearing in place on the supporting shaft;

a rubber member secured around an external surface of the plastic sliding bearing; and a pair of cylindrical bushing members closely fitted into the sleeve so as to secure the rubber member on an inner surface of the sleeve to enable the cylindrical external contact and the sleeve to tilt with respect to the supporting shaft by using a resilient characteristic of the rubber member.

2. A pinch roller assembly, for use in a video cassette recorder, comprising:

a cylindrical external contact having a contact surface for contacting a magnetic tape;

a sleeve closely fitted into the cylindrical external contact;

a supporting shaft extending through the sleeve, the supporting shaft having a small diameter section and a large diameter section;

a metallic sliding bearing for carrying the cylindrical external contact and the sleeve about the supporting shaft, the metallic sliding bearing being rotatably retained around a lower portion of the small diameter section of the supporting shaft by an upper end of the large diameter section of the supporting shaft;

a fixing cap mounted around the small diameter section to keep the metallic sliding bearing in place on the supporting shaft;

a rubber member secured around an external surface of the metallic sliding bearing; and a pair of cylindrical bushing members closely fitted into the sleeve so as to secure the rubber member on an inner surface of the sleeve to enable the cylindrical external contact and the sleeve to tilt with respect to the supporting shaft by using a resilient characteristic of the rubber member.

* * * * *

UNITED STATES PATENT AND TRADEMARK OFFICE
CERTIFICATE OF CORRECTION

PATENT NO. : 5,803,335
DATED : September 8, 1998
INVENTOR(S) : Chang-Ho Lee

It is certified that error appears in the above-identified patent and that said Letters Patent is hereby corrected as shown below:

Title page, item [75] should read:
[75] Inventor: Chan-Ho Lee, Seoul, Korea

Signed and Sealed this

Twenty-second Day of December, 1998

Attest:

BRUCE LEHMAN

Attesting Officer  Commissioner of Patents and Trademarks